US012228496B2

(12) United States Patent
Chun et al.

(10) Patent No.: US 12,228,496 B2
(45) Date of Patent: Feb. 18, 2025

(54) APPARATUS AND METHOD FOR CELL PARTICLE SORTING BASED ON MICROFLUIDIC-CHIP FLOWS

(71) Applicant: KOREA INSTITUTE OF SCIENCE AND TECHNOLOGY, Seoul (KR)

(72) Inventors: Myung-Suk Chun, Seoul (KR); Sun Mi Lee, Seoul (KR); Jae Hun Kim, Seoul (KR); Chansung Park, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 669 days.

(21) Appl. No.: 17/083,299

(22) Filed: Oct. 29, 2020

(65) Prior Publication Data

US 2022/0113243 A1    Apr. 14, 2022

(30) Foreign Application Priority Data

Oct. 14, 2020 (KR) .......................... 10-2020-0132871

(51) Int. Cl.
    *G01N 15/14*    (2024.01)
    *B01L 3/00*    (2006.01)
    *G01N 21/64*    (2006.01)

(52) U.S. Cl.
    CPC .... *G01N 15/1484* (2013.01); *B01L 3/502761* (2013.01); *G01N 15/147* (2013.01);
    (Continued)

(58) Field of Classification Search
    CPC ............. G01N 15/1484; G01N 15/147; G01N 15/0255; G01N 15/0065; G01N 21/64;
    (Continued)

(56) References Cited

U.S. PATENT DOCUMENTS

2011/0096327 A1* 4/2011 Papautsky ................. B03B 5/32
                                                    209/132
2012/0063971 A1* 3/2012 Carlo ................. B01L 3/502707
                                                    219/121.72
(Continued)

FOREIGN PATENT DOCUMENTS

JP       2008-137003 A    6/2008
KR       10-1489930 B1    2/2015
(Continued)

OTHER PUBLICATIONS

Xiang, N., Shi, Z., Tang, W., Huang, D., Zhang, X., & Ni, Z. (2015). Improved understanding of particle migration modes in spiral inertial microfluidic devices. Rsc Advances, 5(94), 77264-77273 (Year: 2015).*
Korean Office Action for KR Application No. 10-2020-0132871 mailed on May 22, 2022.
(Continued)

*Primary Examiner* — Samuel P Siefke
*Assistant Examiner* — Alea N. Martin
(74) *Attorney, Agent, or Firm* — CANTOR COLBURN LLP

(57) ABSTRACT

Provided is an apparatus for cell particle sorting based on microfluidic-chip flow, by using a design in which Dean flow focusing occurring in a spiral channel and hydrodynamic filtration are coupled. The apparatus comprises a first substrate including a spiral channel having an inner surface and an outer surface based on a radius of curvature, a sample solution inlet, a medium inlet, and a spiral inner-outlet and a spiral outer-outlet both for discharging the particles, and a second substrate including a main channel in which the sample solution discharged from the first substrate and passing through an inter-substrate way flows and a cut-off width $W_C$ is set, a side channel allowing a medium introduced into the medium inlet to flow to focus the sample solution on a sidewall of the main channel, a plurality of (Continued)

branch channels connected to the sidewall of main channel and configured to receive the particles from the main channel, a main channel outlet, and at least one branch channel outlet.

16 Claims, 12 Drawing Sheets

(52) U.S. Cl.
CPC ...... *G01N 21/64* (2013.01); *B01L 2200/0652* (2013.01); *B01L 2400/0478* (2013.01); *G01N 2015/1472* (2013.01)

(58) Field of Classification Search
CPC ....... G01N 2015/1472; B01L 3/502761; B01L 3/502753; B01L 3/502776; B01L 3/50273; B01L 2200/0652; B01L 2200/026; B01L 2200/0636; B01L 2400/0478; B01L 2400/086; B01L 2400/0463; B01L 2400/0409; B01L 2300/0816; B01L 2300/0874; B01L 2300/0887; B01L 2300/0681
See application file for complete search history.

(56) References Cited

U.S. PATENT DOCUMENTS

| | | | | |
|---|---|---|---|---|
| 2014/0093867 | A1* | 4/2014 | Burke | B01L 3/502776 |
| | | | | 435/5 |
| 2017/0292104 | A1* | 10/2017 | Ebrahimi Warkiani | ..................... |
| | | | | C12M 47/02 |
| 2019/0344273 | A1* | 11/2019 | Bhagat | B01L 3/502761 |
| 2020/0306756 | A1* | 10/2020 | Kubo | G01N 33/5002 |

FOREIGN PATENT DOCUMENTS

| | | | |
|---|---|---|---|
| KR | 10-2016-0064768 A | | 6/2016 |
| KR | 20160064768 A | * | 10/2016 |
| KR | 10-2017-0062041 A | | 6/2017 |
| WO | 2020/139218 A1 | | 7/2020 |

OTHER PUBLICATIONS

Heekyung Jung et al., "Sorting of human mesenchymal stem cells by applying optimally designed microfluidic chip filtration", Analyst, 2015, pp. 1265-1274, The Royal Society of Chemistry.
Korean Notice of Allowance for KR Application No. 10-2020-0132871 mailed on Nov. 28, 2022.

* cited by examiner

PARTICLE FOCUSING DUE TO
INERTIAL LIFT FORCE

PARTICLE FOCUSING DUE TO
INERTIAL LIFT FORCE AND
DEAN DRAG FORCE

FLOW CONDITIONS:
LOW DEAN NUMBER (De)

FLOW CONDITIONS:
HIGH DEAN NUMBER (De)

Dean flow focusing with single HDF

Dean flow focusing with double HDF

APPARATUS AND METHOD FOR CELL PARTICLE SORTING BASED ON MICROFLUIDIC-CHIP FLOWS

TECHNICAL FIELD

The present invention relates to an apparatus and a method for cell particle sorting based on microfluidic-chip flow, and more particularly, to an apparatus and a method for cell particle sorting based on microfluidic-chip flow with increased sorting efficiency by using a design in which Dean flow focusing occurring in a spiral channel and hydrodynamic filtration (HDF) are coupled.

BACKGROUND ART

Fluorescence-activated cell sorter (FACS), widely used for size-dependent cell particle separations in flow cytometry, is disadvantageous in terms of low throughput due to a batch method, possibility of damage in a sample by pretreatment, and expensive devices, and thus, attempts to apply microfluidic-chip technology to overcome these disadvantages have gradually expanded. Among particle sorting technologies using microfluidic-chips, Dean flow focusing and hydrodynamic filtration (HDF), which are passive methods based on channel flow, are advantageous in terms of inexpensive devices and simple operation when compared with active methods of applying an external field such as magnetophoresis, dielectrophoresis, and optical techniques. However, Dean flow focusing and hydrodynamic filtration (HDF) techniques are required to overcome limitations on sorting efficiency, e.g., purity and recovery, generally less than 90%.

When a fluid flows through a curved channel, a local flow velocity is changed by a length difference between the outer surface and the inner surface, and thus a pressure gradient is generated in a spanwise direction of the channel. Also, because of a centrifugal force due to curvature of the channel, the fluid inertia is generated in the opposite direction to the pressure gradient. A secondary flow developed in the spanwise direction according to a magnitude difference between the pressure gradient and the fluid inertia is referred to as Dean flow.

The intensity of the Dean flow is determined by the dimensionless Dean number De (De=Re(W/R$_c$)$^{1/2}$), wherein Re is the Reynolds number, indicating the ratio of inertial force to viscous force, W is the width of the channel, and R$_c$ is the radius of curvature of the channel. That is, as the Reynolds number Re increases, the radius of curvature R$_c$ decreases, and the ratio of width W to height H of the channel (W/H) increases (i.e., shallow channel), axial velocity profile becomes more slanted to one side due to a drag force caused by a strong Dean flow, and this is well known to those of ordinary skill in the art. In this regard, as the Dean number (De) increases, the fluid inertia increases, such that axial velocity profile becomes skewed into the outer surface of the channel.

FIG. 1 is a conceptual diagram to explain a comparison of particle focusing in a curved channel between a case where only Dean vortex, Dean flow distribution, and inertial lift force F$_L$ are present and a case where both inertial lift force and Dean drag force F$_D$ are present. Here, v$_z$ indicates a flow direction in the channel, and when a Dean flow is generated in a spanwise direction in a curved channel, Dean vortices are developed, which are characterized by the presence of two counter-rotating vortices, i.e., counter-clockwise rotation located above the plane of symmetry of the channel and clockwise rotation below the symmetric plane. In addition, the Dean flow is patterned as a flow in a curved direction of a channel (i.e., from the outer surface to the inner surface of the channel) close to upper and lower walls of the channel and a flow in the opposite direction (i.e., from the inner surface to the outer surface of the channel) to the curved direction of the channel at the center of the channel.

When the Dean flow is not considered, particles are affected by inertial lift forces (F$_L$) and focused on four equilibrium positions near top, bottom, left, and right regions of the channel cross-section where inertial lift forces induced by a strong shear flow at the center region of the channel are balanced with inertial life forces induced by channel walls, both acting in opposite directions. When Dean drag force generated in a curved channel is applied thereto, particles located close to the upper and lower walls move in an inward direction of the curved channel (i.e., from outer surface to inner surface of the channel) by the Dean drag forces F$_D$. Particles close to the outer surface of the channel move in the direction toward the inner surface of the channel along the vortices due to the drag forces and the lift forces in the same direction, whereas particles close to the inner surface of the channel mostly stay due to the lift forces and the drag forces in the opposite direction. As a result, the particles are focused on the inner surface of the channel.

When a particle diameter is D, the inertial lift force F$_L$ is expressed as a function of D$^4$ and the Dean drag force F$_D$ is expressed as a function of D. FIG. 2 shows the sorting behavior according to the degree of focusing by a magnitude difference between the inertial lift force and the Dean drag force in a given Dean number (De). Although sorting of bidisperse sample solution consisting of two-sized fractions, i.e., small-sized particles and large-sized particles, is exemplarily shown, more fractions of particle sizes may be sorted according to embodiment. In the regime of low De, in which the effect of Dean drag force is insufficient (i.e., generally, 5 or less), smaller particles tend to move to the inner surface of the spiral channel. However, as the De increases, this tendency decreases so that larger particles have greater F$_L$/F$_D$ values in the regime of sufficiently high De (i.e., generally, 20 or more), and thus relatively large-sized particles move to the inner surface of the spiral channel more strongly.

Hydrodynamic filtration is based on flow resistance in a laminar flow and flow fraction at an arbitrary position in a channel. Many studies have been performed on hydrodynamic filtration for various types of particles and cells, and an example thereof is disclosed in a paper of Jung et al., ("Sorting of human mesenchymal stem cells by applying optimally designed microfluidic-chip filtration", *Analyst*, 140, 1265-1274, 2015).

FIG. 3 is a plan view illustrating the principle of hydrodynamic filtration. A hydrodynamic filtration device comprises: a main channel 210; a side channel 220 connected to one sidewall of the main channel 210; and at least one branch channel 230 connected to the other sidewall of the main channel 210. In the hydrodynamic filtration device, when a sample solution of particle dispersion is continuously supplied into the main channel 210 and flows in the z direction therein, separation occurs by selective extraction of streamlines determined by the flow fraction at each branch point S$_b$.

As shown in FIG. 3, the sample solution supplied into the main channel 210 may consist of two or more particle fractions with different sizes. Whether a particle enters the branch channel 230 is determined by a comparison between a cut-off width W$_C$ and a particle radius, and thus particle sorting may be performed by moving some or all of the particles into the branch channel 230 from the main channel 210. Since the side channel 220 is continuously introducing the medium, the sample solution of particle dispersion is focused on a sidewall of the main channel 210 opposite to the side channel 220.

RELATED ART DOCUMENT

Reference Paper

"Sorting of human mesenchymal stem cells by applying optimally designed microfluidic chip filtration", *Analyst*, 140, 1265-1274 (2015)

DISCLOSURE

Technical Problem

According to an aspect of the present invention, Dean flow focusing, which occurs in a spiral channel in accordance with a value of De determined by flow conditions of a sample solution flowing into the spiral channel, and hydrodynamic filtration are effectively coupled. Provided are a novel apparatus and method for particle sorting, easily designed and manufactured and capable of increasing sorting efficiency such as purity and recovery up to 95%, increasing throughput by continuous operation, and preventing damage to the particles in a trimodal sample solution consisting of a small-sized particle group, a medium-sized particle group, and a large-sized particle group.

Technical Solution

FIGS. 4 to 6 show apparatuses for sorting a tridisperse sample solution consisting of small-sized particles $D_S$, medium-sized particles $D_M$, and large-sized particles $D_L$, which are respectively monodispersed, without being limited thereto. That is, these apparatuses may also be applied to a trimodal sample solution in which particles are distributed in a Gaussian form with a small-sized particle group ($D_S \pm \sigma_S$), a medium-sized particle group ($D_M \pm \sigma_M$), and a large-sized particle group ($D_L \pm \sigma_L$), like cell particles. In this regard, $\sigma_S$, $\sigma_M$, and $\sigma_L$ are standard deviations of the respective particle groups.

According to an embodiment, provided is an apparatus for cell particle sorting based on microfluidic-chip flow comprising: a first substrate 100 where Dean flow focusing occurs; a second substrate 200 where hydrodynamic filtration occurs; and an inter-substrate way connecting the first substrate 100 to the second substrate 200, wherein at least a part of a sample solution of cell particles moves to the second substrate 200 after passing through the first substrate 100, and a connection method of the inter-substrate way varies according to a value of De determined by flow conditions of the sample solution flowing into the first substrate 100.

In an embodiment, the first substrate 100 comprises a spiral channel 110 having an inner surface and an outer surface based on a radius of curvature; a sample solution inlet 120 located at the center of the spiral channel 110; a medium inlet 125 located at an outermost portion of the spiral channel 110; an inner outlet-way 150 diverging from the end of the spiral channel 110 to be relatively adjacent to the inner surface and an outer outlet-way 160 diverging therefrom to be relatively adjacent to the outer surface; and a spiral inner-outlet 130 and a spiral outer-outlet 140 as outlets for discharging the cell particles to the outside through at least one of the inner outlet-way 150 and the outer outlet-way 160.

In an embodiment, the second substrate 200 comprises: a main channel 210 in which the sample solution discharged from the first substrate 100 and passing through the inter-substrate way flows and a $W_C$ value is set; a side channel 220 connected to the main channel 210 and allowing the medium introduced into the medium inlet 125 of the first substrate 100 to flow therein to focus the sample solution on a sidewall of the main channel 210 opposite to a medium introduction side; at least one branch channel 230 connected to the sidewall of main channel 210 in a spanwise direction and configured to receive the cell particles from the main channel 210; a branch channel collector 233 in which ends of the branch channels 230 join; and a hydrodynamic filtration channel comprising a main channel outlet 215 and at least one branch channel outlet 235. In this regard, the hydrodynamic filtration channel refers to a member that performs the hydrodynamic filtration sorting and comprises the main channel 210, the side channel 220, the branch channel 230, the branch channel collector 233, the main channel outlet 215, and the branch channel outlet 235 as described above.

In an embodiment, two or more hydrodynamic filtration channels may be independently installed by designing the hydrodynamic filtration channels to have different $W_C$ values in accordance with flow conditions of the sample solution and size fractions of particles.

In an embodiment, the inter-substrate way connecting the first substrate 100 to the second substrate 200 may comprise a medium inter-substrate way 320 allowing the medium injected into the medium inlet 125 of the first substrate 100 to flow toward the side channel 220 of the second substrate 200; an outer-outlet inter-substrate way 310 allowing cell particles discharged through the spiral outer-outlet 140 to flow toward the main channel 210 of the second substrate 200; and an inner-outlet inter-substrate way 330 allowing cell particles discharged through the spiral inner-outlet 130 to flow toward another main channel 210' of the second substrate 200 when the second substrate 200 comprises two or more hydrodynamic filtration channels having different $W_C$ values.

In an embodiment, under low-flow velocity conditions (i.e., De<5), the tridisperse sample solution injected into the sample solution inlet 120 of the first substrate 100 flows in such a mode that small-sized particles are discharged to the outside through the inner outlet-way 150 of the spiral channel 110 and then the spiral inner-outlet 130, and medium-sized and large-sized particles flow into the main channel 210 of the second substrate 200 after passing through the outer outlet-way 160 of the spiral channel 110, the spiral outer-outlet 140, and the outer-outlet inter-substrate way 310, following that the medium-sized particles are discharged through the branch channel outlet 235 (i.e., HDF Outlet 1) and the large-sized particles are discharged through the main channel outlet 215 (i.e., HDF Outlet 2).

In contrast, under high-flow velocity conditions (i.e., De>20), the tridisperse sample solution flows in such a mode that the large-sized particles are discharged to the outside through the inner outlet-way 150 of the spiral channel 110 and then the spiral inner-outlet 130, and the medium-sized and the small-sized particles flow into the main channel 210 of the second substrate 200 after passing through the outer outlet-way 160 of the spiral channel 110, the spiral outer-outlet 140, and the outer-outlet inter-substrate way 310, following that the small-sized particles are discharged through the branch channel outlet 235 (i.e., HDF Outlet 1) and the medium-sized particles are discharged through the main channel outlet 215 (i.e., HDF Outlet 2).

In an embodiment, when two or more hydrodynamic filtration channels having different $W_C$ values are formed in the second substrate 200, under low-flow velocity conditions (i.e., De<10), the tridisperse sample solution injected into the sample solution inlet 120 of the first substrate 100 flows in such a mode that the medium-sized and the large-sized particles flow into a main channel 210 of the second substrate 200 after passing through the outer outlet-way 160 of the spiral channel 110, the spiral outer-outlet 140, and the outer-outlet inter-substrate way 310, following that the medium-sized particles are discharged through the branch channel outlet 235 (i.e., HDF Outlet 1) and the large-sized particles are discharged through the main channel outlet 215 (i.e., HDF Outlet 2). Meanwhile, the medium-sized and the small-sized particles flow into a next main channel 210' of the second substrate 200 after passing through the inner outlet-way 150 of the spiral channel 110, the spiral inner-outlet 130, and the inner-outlet inter-substrate way 330, following that the small-sized particles are discharged through a next branch channel outlet 235' (i.e., HDF Outlet 3) and the medium-sized particles are discharged through a next main channel outlet 215' (i.e., HDF Outlet 4).

In contrast, under high-flow velocity conditions (i.e., De>10), the tridisperse sample solution flows in such a mode that the medium-sized and the small-sized particles flow into the main channel 210 of the second substrate 200 after passing through the outer outlet-way 160 of the spiral channel 110, the spiral outer-outlet 140, and the outer-outlet inter-substrate way 310, following that the small-sized particles are discharged through the branch channel outlet 235 (i.e., HDF Outlet 1) and the medium-sized particles are discharged through the main channel outlet 215 (i.e., HDF Outlet 2). Meanwhile, the medium-sized and the large-sized particles flow in the next main channel 210' of the second substrate 200 after passing through the inner outlet-way 150 of the spiral channel 110, the spiral inner-outlet 130, and the inner-outlet inter-substrate way 330, following that the medium-sized particles are discharged through the next branch channel outlet 235' (i.e., HDF Outlet 3) and the large-sized particles are discharged through the next main channel outlet 215' (i.e., HDF Outlet 4).

In an embodiment, the sample solution consists of tri-modal samples with a small-sized particle group, a medium-sized particle group, and a large-sized particle group. When the second substrate 200 includes one hydrodynamic filtration channel having a $W_C$ value to perform hydrodynamic filtration, a width of the inner outlet-way ($W_{SP-I}$) at the end of the spiral channel 110 of the first substrate 100 satisfies an equation of $$D_L + \sigma_L < W_{SP-I} \le \frac{W_{SP}}{3f},$$

wherein $D_L$ is an average diameter of the large-sized particle group, $\sigma_L$ is a standard deviation, $W_{SP}$ is a width of the spiral channel, f is an adjustment factor generally in the range of 1 to 2, and a width $W_{SP-O}$ of the outer outlet-way is obtained by $W_{SP}$-$W_{SP-I}$.

In an embodiment, when two hydrodynamic filtration channels having different $W_C$ values are formed on the second substrate 200, a width $W_{SP-I}$ of the inner outlet-way and a width $W_{SP-O}$ of the outer outlet-way at the end of the spiral channel 110 of the first substrate 100 satisfy equally ½ of the width of the spiral channel.

In an embodiment, when diameters of the cell particles are expressed as D, a width of the spiral channel 110 is expressed as $W_{SP}$, and a height of the spiral channel 110 is expressed as H, the equation of $D(W_{SP}+H)/2W_{SP}H>0.07$ is satisfied.

In an embodiment, when diameters of the cell particles are expressed as D, a radius of curvature of the spiral channel 110 is expressed as $R_C$, and a height of the spiral channel 110 is expressed as H, the equation of $0.08 \le 2D^2R_C/H^3 < 25$ is satisfied.

In an embodiment, the branch channel 230 comprises a narrow section 231 acting as a substantial flow resistance for filtration and a wide section 232 having a greater width than that of the narrow section 231 by 1.5 times or more for the purpose of preventing backflow, and lengths of the narrow section 231 and the wide section 232 vary according to computed design values, respectively.

In an embodiment, the sample solution includes a plurality of cell particle fractions (Np) with different sizes, wherein the number of the branch channel outlets 235 in an individual hydrodynamic filtration channel is Np-2, two less than the number of particle fractions.

According to an embodiment, provided is a method for cell particle sorting based on microfluidio-chip flow, the method comprising: injecting a sample solution including particles into a spiral channel 110 of a first substrate 100; injecting a medium into a medium inlet 125 of the first substrate 100 allowing the medium to flow in a side channel 220 of a second substrate 200 through an inter-substrate way; focusing and sorting the particles under flow conditions of the sample solution by inertial lift force and Dean drag force in the spiral channel 110 of the first substrate 100 having an inner surface and an outer surface with respect to a radius of curvature; discharging the particles from the spiral channel 110 through the inner outlet-way 150 and the outer outlet-way 160 and then the spiral inner-outlet 130 and the spiral outer-outlet 140; moving the particles of the sample solution discharged from the spiral channel 110 located above the second substrate 200 to the second substrate 200 via the inter-substrate way; focusing the sample solution flowing in the main channel 210 of the second substrate 200 on a sidewall of the main channel 210 by the medium; and sorting the particles while the sample solution flows in the main channel 210 and at least one branch channel 230.

In an embodiment, since the sample solution includes first particles and second particles smaller than the first particles, the sorting of the particles by Dean flow focusing based on the De value and discharging from the first substrate 100 may comprise: discharging the first particles or the second particles through the spiral inner-outlet 130 located relatively adjacent to the inner surface of the spiral channel 110; and discharging the first particles or the second particles through the spiral outer-outlet 140 located relatively adjacent to the outer surface of the spiral channel 110.

In an embodiment, the sorting of the particles by hydrodynamic filtration based on the size in the second substrate 200 may further include transporting particles in the main channel 210 without entering into the branch channel 230 to a next branch channel 230 located behind the branch channel 230 according to cut-off widths $W_C$ and particle radii; sorting the particles in the next branch channel 230 according to cut-off widths $W_C$ and particle radii; and discharging the particles to the outside through the branch channel collector 233 by repeating the above-described process by the number of the branch channels 230, and then through the branch channel outlet 235.

Advantageous Effects

According to a microfluidic-chip apparatus and a method therefor according to an embodiment of the present invention, Dean flow focusing occurring in the spiral channel 110 may be effectively coupled with hydrodynamic filtration according to a value of Dean number (De). In comparison with conventional cell particle sorting methods using individual Dean flow focusing or hydrodynamic filtration, sorting efficiency may be increased and a substrate device having multiple layers or a single layer connected via an inter-substrate way may be designed in the combination according to the present invention. For example, an inter-substrate way may be formed between a first substrate and a second substrate vertically provided in a multi-layered substrate device, or an inter-substrate way may be formed between a first substrate and a second substrate arranged in the same plane by an additional external member in a single-layered substrate device. In the device according to the present invention, the types of the single- and multi-layered substrates are not particularly limited.

The apparatus and the method may be implemented in the form of a microfluidic-chip and may be widely applied to micro total analysis systems performing sorting, counting, fractionation, and the like for not only rigid nano and colloidal particles that are not deformed, but also deformable soft erythrocytes, leukocytes, hepatocytes, stem cells, and cancer cells.

MODE FOR INVENTION

Hereinafter, embodiments of the present invention will be described in detail with reference to the accompanying drawings.

When a particle having a diameter of D flows in a spiral channel 110 having a hydraulic diameter of $D_H$, it is known that conditions of Equation 1 below need to be satisfied to induce particle focusing by inertial lift force.

$$D/D_H > 0.07 \qquad \text{[Equation 1]}$$

Since the hydraulic diameter $D_H$ of the spiral channel 110 having a width of $W_{SP}$ and a height of H is $2W_{SP}H/(W_{SP}+H)$, Equation 1 may be provided as $D(W_{SP}+H)/2W_{SP}H > 0.07$. In this regard, the height H is a vertical length of the channel cross-section from the bottom surface of the channel, and thus may also be referred to as a depth with respect to the top surface of the channel.

Furthermore, for proper particle sorting in the spiral channel 110, it is known that a ratio of inertial lift forces to Dean drag forces (i.e., $F_L/F_D = 2D^2 R_C/H^3$) should be about 0.08 or more and several tens or less. In an embodiment of the present invention, the ratio is equal to or less than 25 and may be provided as Equation 2 below.

$$0.08 \leq F_L/F_D < 25 \qquad \text{[Equation 2]}$$

Accordingly, in the apparatus for cell particle sorting based on microfluidic-chip flow according to an embodiment, the shape of the spiral channel 110 may be determined using Equations 1 and 2 as design conditions.

A 1/16 inch tubing having a diameter of 1.59 mm may be installed at the sample solution inlet 120 located at the central space of the spiral channel 110. The turning number of the spiral channel 110 may be determined as an arbitrary natural number Ns, and accordingly the radius of curvature $R_C$ varies depending on a spiral position. Also, particles may be sorted by size by appropriately configuring outlets through which the particles are discharged from the spiral channel 110, satisfying the above-described conditions.

Figure 1:
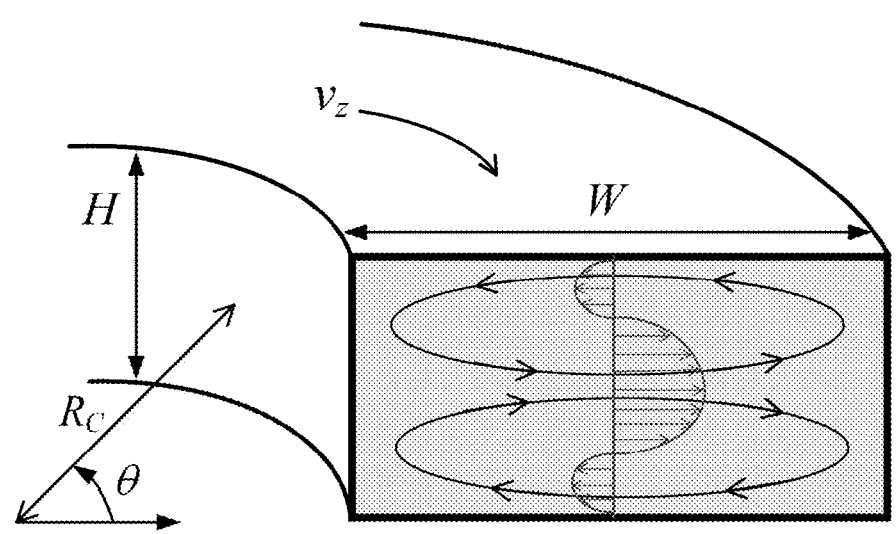
FIG. 1 is a conceptual diagram to explain a comparison of particle focusing in a curved channel between a case where only Dean vortex, Dean flow distribution, and inertial lift force are present and a case where both inertial lift force and Dean drag force are present.
Figure 1:
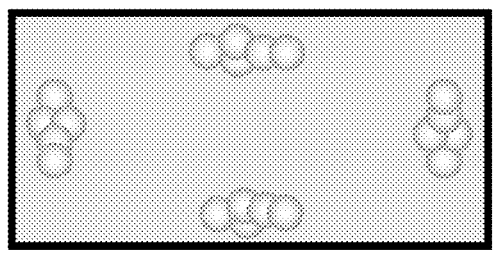
Figure 1:
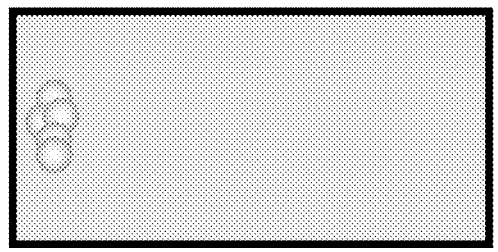
Figure 2:
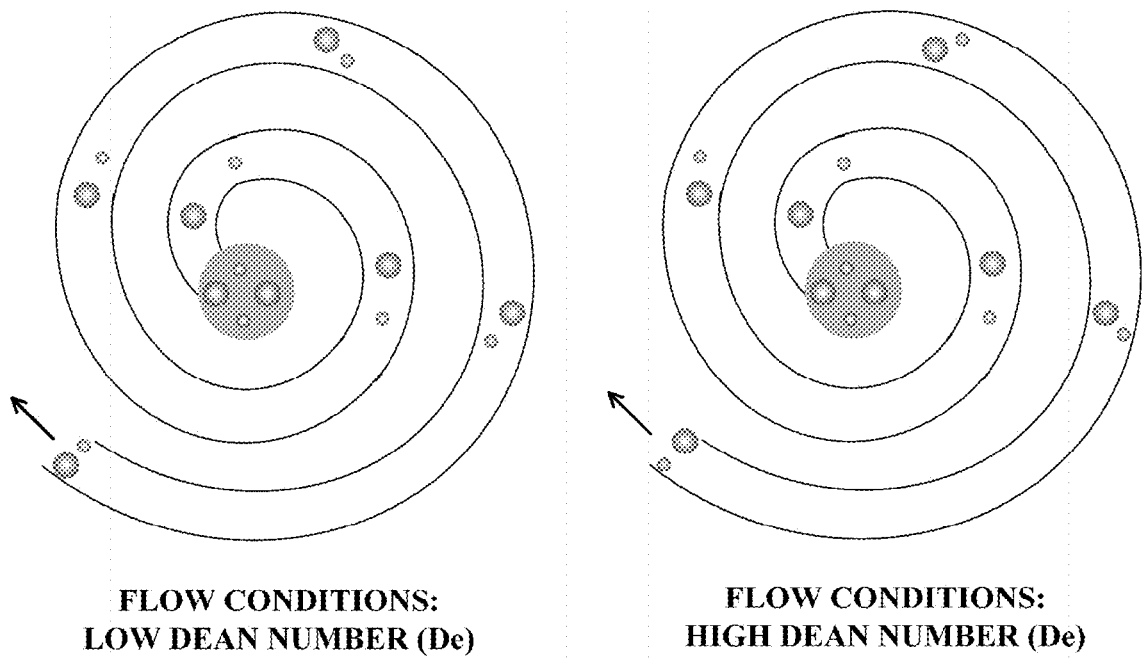
FIG. 2 is a conceptual diagram illustrating the particle sorting behavior according to the degree of focusing by a magnitude difference between inertial lift force and Dean drag force for the De value related to flow conditions of a sample solution in a spiral channel.
Figure 3:
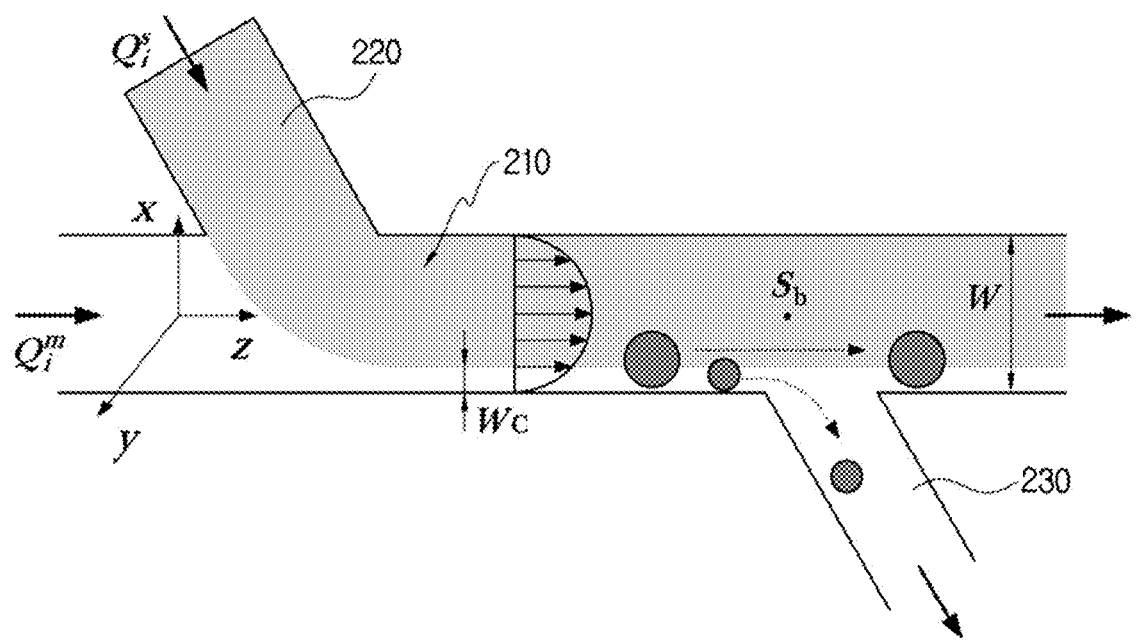
FIG. 3 is a plan view illustrating the principle of conventional hydrodynamic filtration.

In FIG. 3, which is a plan view of the hydrodynamic filtration device viewed in the y direction, the side channel 220 may be connected to the main channel 210 at an angle of about 45° to about 90° with the main channel 210. Since the main channel 210 is connected to the side channel 220 with an angle within the above range, focusing of the sample solution of particle dispersion is effectively performed by the medium introduced through the side channel 220. Although the branch channel 230 having one channel is illustrated, multiple straight channels may actually be used to maximize flow focusing effects. Streamlines adjacent to the wall of the main channel 210 where the branch channel 230 is formed enter the branch channel 230, and particles with their center-of-mass located at these streamlines also enter the branch channel 230. The amount of fluid flowing into the branch channel 230 is determined by flow distribution between the main channel 210 and the branch channel 230 in relation to flow resistance in channel networks in which several to dozens of multiple branch channels 230 are formed.

Whether the particles flow into the branch channel 230 is determined by the flow distribution according to a comparison between the particle radius and the cut-off width $W_C$ in the x direction, and a width $W_B$ of the branch channel 230 may be less than the width W of the main channel 210. When a flow rate in the range of $-X \leq x \leq 0$ (or $0 \leq x \leq X$, due to symmetry) is expressed as $Q_X$ with $X=W/2-W_C$, relationships $Q_i^m + Q_i^s = Q$ and $Q_i^m + Q_X = Q/2$ are established, wherein W is a width of the main channel 210, $Q_i^m$ is a flow rate at the inlet of the main channel 210, and $Q_i^m$ is a flow rate at the inlet of the side channel 220. Thus, at a branch point $S_b$ where the branch channel 230 diverges from the main channel 210, the flow ratio $(Q_i^m/Q_i^m)$ is defined by $(Q-2Q_X)/(Q+2Q_X)$.

In this regard, the flow rate may be obtained by integrating velocity profile computed from the equation of motion and boundary conditions for steady-state and laminar flow of Newtonian or non-Newtonian fluids in a rectangular channel over the rectangular cross-section of the channel. Meanwhile, the flow rate between the branch channel 230 and the main channel 210 at a branch point of the j-th branch channel 230 in the channel network composing multiple branch channels 230 may be defined by Equation 3 below.

$$\left.\frac{Q^b}{Q^m}\right|_{S_j} = \frac{1 - 2X/W - (192/\pi^5)(H/W)\sum_{n=odd}^{\infty}[n^{-5}(\Gamma_1 - \Gamma_3/\Gamma_2)]}{1 + 2X/W - (192/\pi^5)(H/W)\sum_{n=odd}^{\infty}[n^{-5}(\Gamma_1 - \Gamma_3/\Gamma_2)]} \quad \text{[Equation 3]}$$

In Equation 3, $\Gamma_1 = \tan h(n\pi W/2H)$, $\Gamma_2 = \cos h(n\pi W/2H)$, $\Gamma_3 = \sin h(n\pi X/H)$, and W and H are a width and a height of the main channel 210, respectively.

Particles flowing into the branch channel 230 from the main channel 210 are separated and discharged to the outside through outlet after passing through the branch channel collector 233 in which the ends of the multiple branch channels 230 join. In this regard, the microfluidic-chip is designed such that the number of the outlets is the same as that of fractions to be separated by size from the sample solution in which different sized particles are dispersed. From the relationships between Equation 3 and pressure drop at each branch point, the $W_C$ value, the width, height, and length of each channel, the number of branch channels 230, the distance between branch channels 230, the number of outlets, and the other design values for sorting of desired particles are determined by complicated iterative computations.

The branch channel 230 may comprises a narrow section 231 acting as a substantial flow resistance for filtration and a wide section 232 having a greater width than that of the narrow section 231 by 1.5 times or more for the purpose of preventing backflow. In the branch channel 230 having the above-described structure, the narrow section 231 may be connected to the sidewall of the main channel 210, and the narrow section 231 extending from the main channel 210 may be connected to the wide section 232. Therefore, the backflow of the particles separated in the narrow section 231 in a direction toward the main channel 210 before being discharged through the branch channel outlet 235 may be prevented. The branch channel 230 may have a structure in which lengths of the narrow section 231 and the wide section 232 vary in accordance with computed design values.

In an embodiment, the sample solution includes a plurality of cell particle fractions (Np) with different sizes, wherein the number of the branch channel outlets 235 in an individual hydrodynamic filtration channel may be Np-2, two less than the number of particle fractions. Therefore, the separated particles are discharged through the main channel outlet 215 formed at the end of the main channel 210 and at least one branch channel outlet 235 after passing through the branch channel collector 233 where the multiple branch channels 230 join.

The structure of the hydrodynamic filtration channel included in the microfluidic-chip apparatus according to an embodiment of the present invention is described above. Hereinafter, the microfluidic-chip apparatus including a spiral channel structure coupled with the hydrodynamic filtration channel will be described in more detail.

Figure 4:
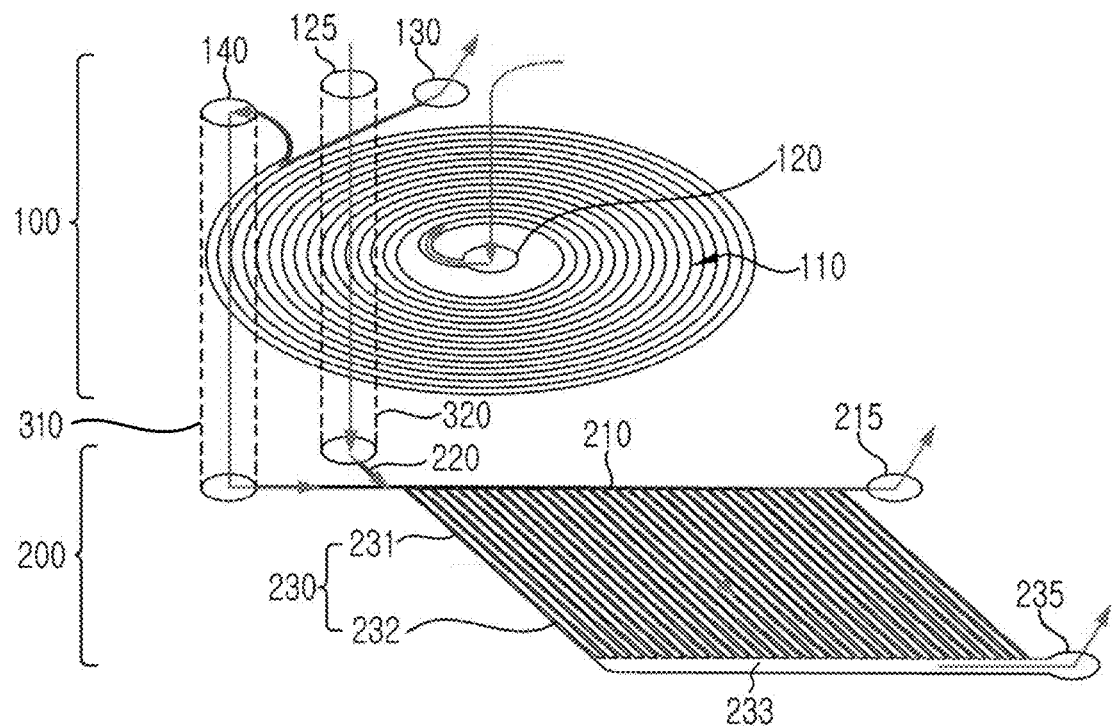
FIG. 4 is a view illustrating an apparatus for cell particle sorting based on microfluidic-chip flow having a spiral channel structure coupled with a single hydrodynamic filtration channel under De conditions according to an embodiment.
Figure 5:
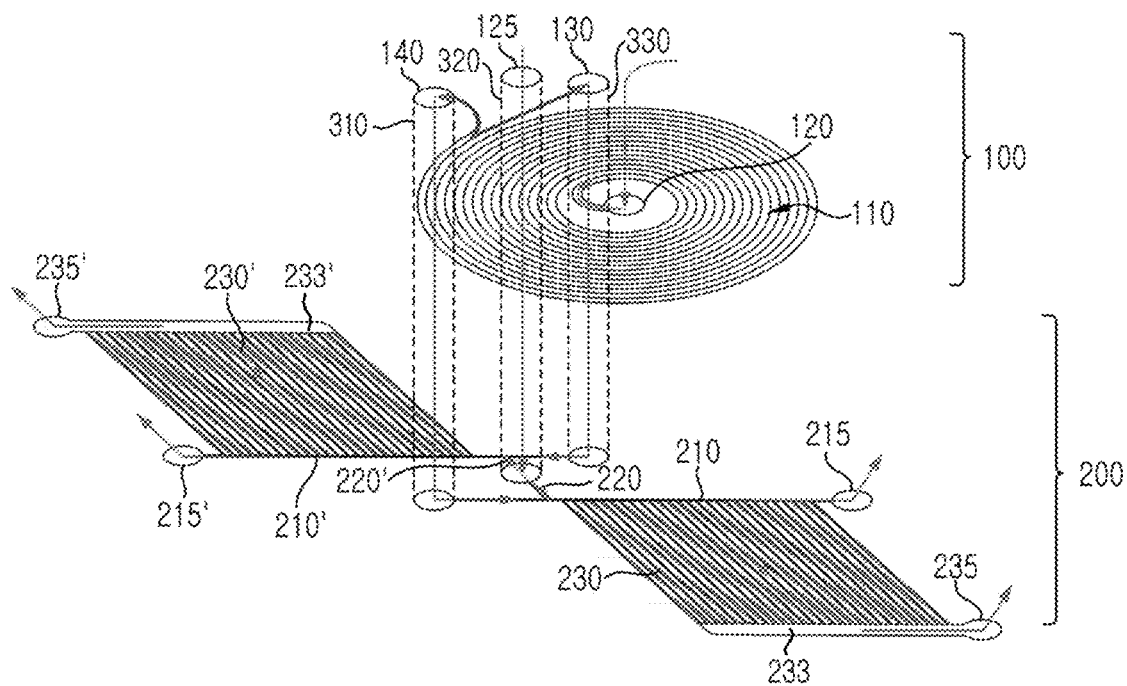
FIG. 5 is a view illustrating an apparatus for cell particle sorting based on microfluidic-chip flow having a spiral channel structure coupled with a double hydrodynamic filtration channel having different $W_C$ values under De conditions according to an embodiment.

FIG. 4 is a view illustrating an apparatus for cell particle sorting based on microfluidic-chip flow, by designing a spiral channel structure coupled with a single hydrodynamic filtration channel under De conditions according to an embodiment. FIG. 5 is a view illustrating an apparatus for cell particle sorting based on microfluidio-chip flow, by designing a spiral channel structure coupled with a double hydrodynamic filtration channel under De conditions according to an embodiment and applicable to sort tridisperse particles or trimodal cell particles.

The apparatus for cell particle sorting based on microfluidic-chip flow according to an embodiment comprises: a first substrate 100 where Dean flow focusing occurs as shown in FIG. 4; a second substrate 200 where hydrodynamic filtration occurs; and an inter-substrate way connecting the first substrate 100 to the second substrate 200.

The first substrate 100 comprises a spiral channel 110 having an inner surface and an outer surface on the basis of radius of curvature; a sample solution inlet 120 located at the center of the spiral channel 110; a medium inlet 125 located at the outermost portion of the spiral channel 110; an inner outlet-way 150 diverging from the end of the spiral channel 110 to be relatively adjacent to the inner surface and an outer outlet-way 160 diverging therefrom to be relatively adjacent to the outer surface; and a spiral inner-outlet 130 and a spiral outer-outlet 140 as outlets for discharging the cell particles to the outside of the outlet ways.

The second substrate 200 comprises: a main channel 210 in which the sample solution discharged from the first substrate 100 and passing through the inter-substrate way flows and a $W_C$ value is set; a side channel 220 connected to the main channel 210 and allowing the medium introduced into the medium inlet 125 of the first substrate 100 to flow to focus the sample solution on a sidewall of the main channel 210 opposite to a medium introduction side; at least one branch channel 230 connected to the sidewall of main channel 210 in a spanwise direction and configured to receive the cell particles from the main channel 210; a branch channel collector 233 in which ends of the branch channels 230 join; and a hydrodynamic filtration channel including a main channel outlet 215 and at least one branch channel outlet 235.

In FIG. 4, the inter-substrate way connecting the first substrate 100 to the second substrate 200 may comprise a medium inter-substrate way 320 allowing the medium injected into the medium inlet 125 of the first substrate 100 to flow toward the side channel 220 of the second substrate 200, and an outer-outlet inter-substrate way 310 allowing particles discharged through the spiral outer-outlet 140 to flow toward the main channel 210 of the second substrate 200. Although the first substrate 100 and the second substrate 200 are provided in a vertical multi-layered structure and the inter-substrate ways vertically connect the first substrate 100 located above the second substrate 200 to the second substrate 200 located below the first substrate 100 in the drawing, the shapes of the first substrate 100 and the second substrate 200 are not limited thereto.

In an embodiment, the spiral channel 110 formed on the first substrate 100, the main channel 210, the side channel 220, and the at least one branch channel 230 formed on the second substrate 200 may have different cross-sectional aspect ratios, i.e., width-height ratios, of the channel.

In FIG. 4, under low-flow velocity conditions (i.e., De<5), the tridisperse sample solution injected into the sample solution inlet 120 flows in such a mode that small-sized particles are discharged to the outside through the inner outlet-way 150 of the spiral channel 110 and then the spiral inner-outlet 130, and medium-sized and large-sized particles flow into the main channel 210 of the second substrate 200 after passing through the outer outlet-way 160 of the spiral channel 110, the spiral outer-outlet 140, and the outer-outlet inter-substrate way 310, following that the medium-sized particles are discharged through the branch channel outlet 235 (i.e., HDF Outlet 1) and the large-sized particles are discharged through the main channel outlet 215 (i.e., HDF Outlet 2). In contrast, under high-flow velocity conditions (i.e., De>20), the tridisperse sample solution flows in such a mode that the large-sized particles are discharged to the outside through the inner outlet-way 150 of the spiral channel 110 and then the spiral inner-outlet 130, and the medium-sized and the small-sized particles flow into the main channel 210 of the second substrate 200 after passing through the outer outlet-way 160 of the spiral channel 110, the spiral outer-outlet 140, and the outer-outlet inter-substrate way 310, following that the small-sized particles are discharged through the branch channel outlet 235 (i.e., HDF Outlet 1) and the medium-sized particles are discharged through the main channel outlet 215 (i.e., HDF Outlet 2).

By performing particle sorting using the spiral channel 110 provided on the first substrate 100, and then performing particle sorting using the hydrodynamic filtration channel provided on the second substrate 200 according to an embodiment of the present invention, particles having different sizes may be sorted while maintaining a high flow rate. Specifically, since particle sorting may be performed at a relatively low flow rate in the hydrodynamic filtration channel and particle sorting may be performed at a relatively high flow rate in the spiral channel 110, sorting efficiency may be increased with high throughput by allowing the sample solution to first pass through the spiral channel 110 and then continuously through the hydrodynamic filtration channel.

In the configuration of the present invention, a plurality of hydrodynamic filtration channels may be connected to the spiral channel 110.

Referring to FIG. 5, two hydrodynamic filtration channels may be connected to the spiral channel 110 provided on the first substrate 100 according to an embodiment. In this regard, two hydrodynamic filtration channels may be independently installed by designing different $W_C$ values in accordance with flow conditions and particle size conditions of the sample solution. Although two hydrodynamic filtration channels are provided in the drawing, the scope of the present invention is not limited thereto.

As shown in FIG. 5, when the two hydrodynamic filtration channels having different $W_C$ values are formed on the second substrate 200, an inner-outlet inter-substrate way 330 allowing particles discharged out of the spiral inner-outlet 130 to flow into a next main channel 210' of the second substrate 200 may further be provided, in addition to the medium inter-substrate way 320 and the outer-outlet inter-substrate way 310.

In FIG. 5, under low-flow velocity conditions (i.e., De<10), the tridisperse sample solution injected into the sample solution inlet 120 of the first substrate 100 flows in such a mode that the medium-sized and the large-sized particles flow into a main channel 210 of the second substrate 200 after passing through the outer outlet-way 160 of the spiral channel 110, the spiral outer-outlet 140, and the outer-outlet inter-substrate way 310, following that the medium-sized particles are discharged through the branch channel outlet 235 (i.e., HDF Outlet 1) and the large-sized particles are discharged through the main channel outlet 215 (i.e., HDF Outlet 2). Meanwhile, the medium-sized and the small-sized particles flow into a next main channel 210' of the second substrate 200 after passing through the inner outlet-way 150 of the spiral channel 110, the spiral inner-outlet 130, and the inner-outlet inter-substrate way 330, following that the small-sized particles are discharged through a next branch channel outlet 235' (i.e., HDF Outlet 3) and the medium-sized particles are discharged through a next main channel outlet 215' (i.e., HDF Outlet 4).

In contrast, under high-flow velocity conditions (i.e., De>10), the tridisperse sample solution flows in such a mode that the medium-sized and the small-sized particles flow into the main channel 210 of the second substrate 200 after passing through the outer outlet-way 160 of the spiral channel 110, the spiral outer-outlet 140, and the outer-outlet inter-substrate way 310, following that the small-sized particles are discharged through the branch channel outlet 235 (i.e., HDF Outlet 1) and the medium-sized particles are discharged through the main channel outlet 215 (i.e., HDF Outlet 2). Meanwhile, the medium-sized and the large-sized particles flow in the main channel 210' of the second substrate 200 after passing through the inner outlet-way 150 of the spiral channel 110, the spiral inner-outlet 130, and the inner-outlet inter-substrate way 330, following that the medium-sized particles are discharged through the next branch channel outlet 235' (i.e., HDF Outlet 3) and the large-sized particles are discharged through the next main channel outlet 215' (i.e., HDF Outlet 4).

Although the channels are illustrated as components having predetermined shapes in the drawings of the specification, each of the channels may be a space in the form of a cavity or a recess formed on a support such as a substrate on which a sample in the form of a fluid may flow. Each of the channels is intended to show the shape of such space in the drawings. The support such as the substrate may be formed of polydimethylsiloxane (PDMS) easily processed to obtain a desired shape, without being limited thereto.

The microfluidic-chip apparatus in which the hydrodynamic filtration channel and the spiral channel structure are coupled is described above. Hereinafter, the spiral channel structure will be described in more detail.

Figure 6:
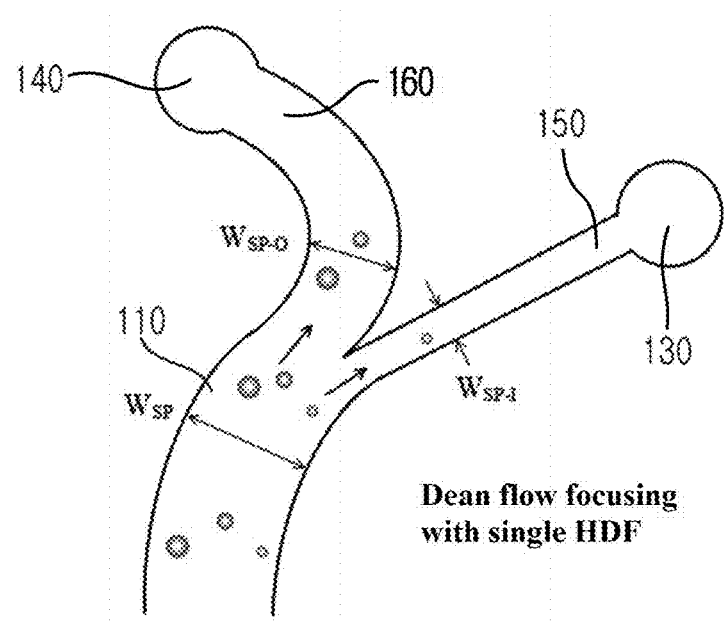
FIG. 6 shows structures of an inner outlet-way, an outer outlet-way, a spiral inner-outlet, and a spiral outer-outlet at the end of a spiral channel formed on a first substrate.
Figure 6:
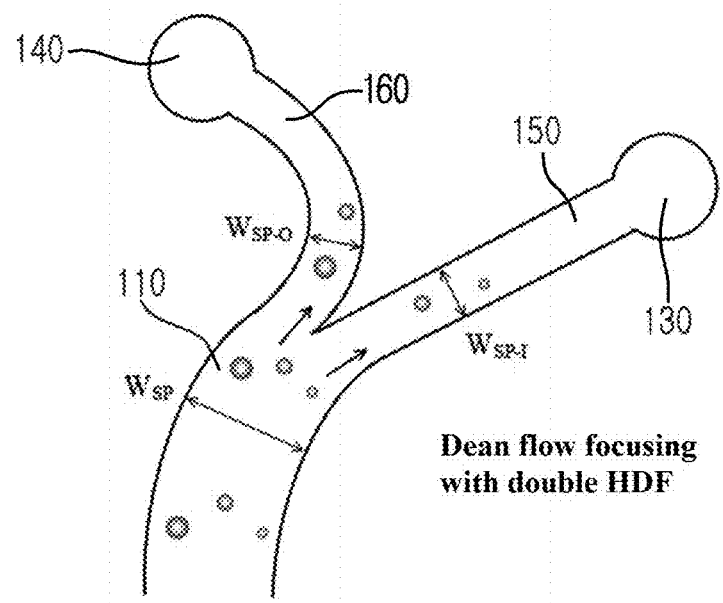

FIG. 6 shows structures of the inner outlet-way 150, the outer outlet-way 160, the spiral inner-outlet 130, and the spiral outer-outlet 140 at the end of the spiral channel 110 formed on the first substrate 100. The width $W_{SP}$ of the spiral channel 110 may be greater than the height H by four times or more. As designed in this geometry, velocity profile slanted to one side of the spiral channel 110 may be obtained by drag forces induced by a Dean flow, and thus particles may be sorted basically using the same.

At the end of the spiral channel 110, the inner outlet-way 150 extends relatively adjacent to the inner surface of the spiral channel 110 to be connected to the spiral inner-outlet 130, and the outer outlet-way 160 extends relatively adjacent to the outer surface of the spiral channel 110 to be connected to the spiral outer-outlet 140. Each outlet way may be installed not to change particle focusing during a process in which particles sorted and flowing from the spiral channel 110 are discharged through respective outlets corresponding thereto.

In an embodiment, widths of the outer outlet-way 160 and the inner outlet-way 150 of the spiral channel 110 may be designed differently according to the number of hydrodynamic filtration channels connected to the spiral channel 110. For example, referring to an upper figure of FIG. 6, when one hydrodynamic filtration channel having a $W_C$ value is formed on the second substrate 200 as shown in FIG. 4, the width $W_{SP-I}$ of the inner outlet-way may be set as shown in Equation 4, and the width $W_{SP-O}$ of the outer outlet-way is obtained by $W_{SP}$-$W_{SP-I}$.

$$D_L + \sigma_L < W_{SP-I} \leq \frac{W_{SP}}{3f} \quad \text{[Equation 4]}$$

In Equation 4, $D_L$ is an average diameter of the large-sized particle group, $\sigma_L$ is a standard deviation, $W_{SP}$ is a width of the spiral channel, and f is an adjustment factor generally in the range of 1 to 2.

Also, referring to the lower figure of FIG. 6, when two hydrodynamic filtration channels having different $W_C$ values are formed on the second substrate 200 as shown in FIG. 5, the width $W_{SP-I}$ of the inner outlet-way and the width $W_{SP-O}$ of the outer outlet-way may be equally set as ½ of the width of the spiral channel 110 at the end of the spiral channel 110 of the first substrate 100.

The microfluidic-chip according to an embodiment of the present invention is described above. Hereinafter, performance of the microfluidic-chip according to an embodiment of the present invention will be described based on data.

Figure 7A:
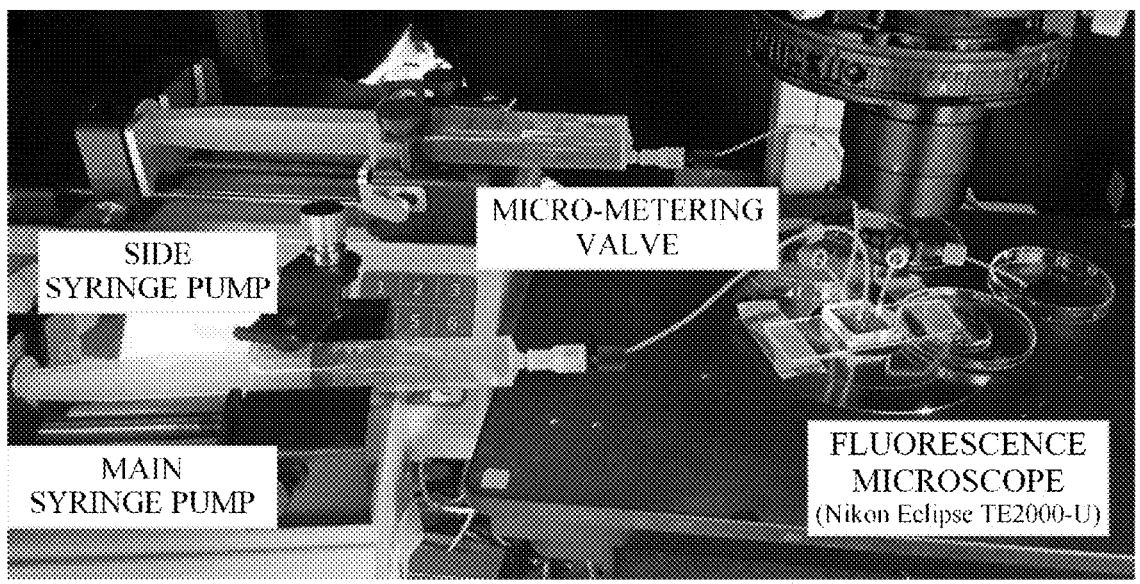
FIG. 7A shows an experimental system for performing cell particle sorting by using a microfluidic-chip flow-based sorting apparatus according to an embodiment.
Figure 7B:
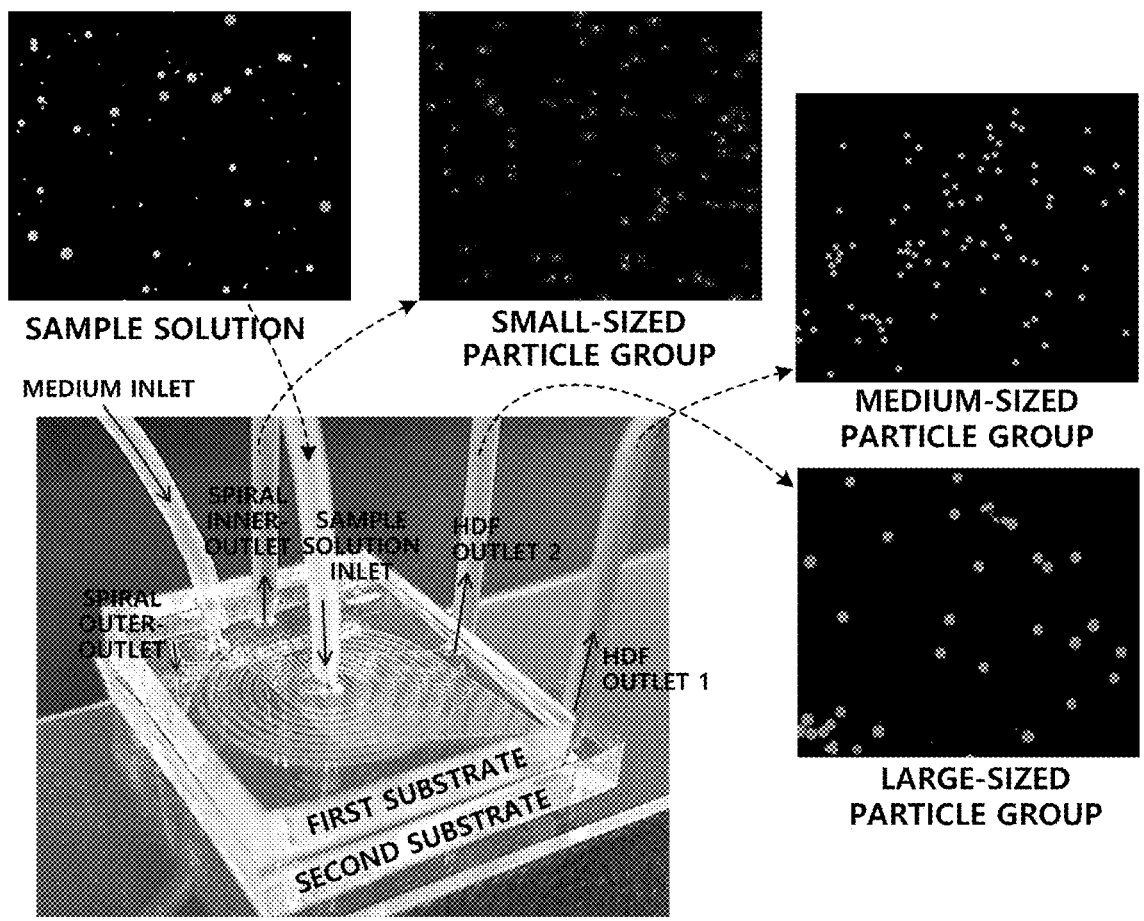
FIG. 7B shows a microfluidic-chip fabricated having a structure in which a spiral channel is coupled with a single hydrodynamic filtration channel according to an embodiment and sorting results of trimodal cell particles using the same.

FIGS. 7A and 7B show an experimental system performing trimodal cell particle sorting by using a microfluidic-chip flow-based sorting apparatus prepared according to an embodiment and sorting results based on size, respectively. Referring to FIG. 7A, tubing may be installed at each inlet and each outlet of the microfluidic-chip, and a sample solution to be separated and a medium may be injected into the sample solution inlet 120 and the medium inlet 125, respectively, at a constant pressure maintained by a main syringe pump and a side syringe pump. The micro-metering valve may be installed at some or all of the spiral inner-outlet 130, the main channel outlet 215, and the branch channel outlet 235 to control flow rates discharged therefrom. The flow rate of the sample solution was set to maintain the De to be about 5, and the side channel flow rate $Q_i^s$ was set to be greater than the main channel flow rate $Q_i^m$ in the second substrate 200, so that the sample solution may sufficiently be focused on the wall of the main channel 210 where the branch channel 230 is formed. Each sample solution sorted based on the sizes of cell particles and discharged through each outlet may be collected in each designated vial, and the flows in specified channels of the microfluidic-chip may be observed in-situ using a microscope.

Referring to FIG. 7B, the microfluidic-chip sorting apparatus according to an embodiment is designed and fabricated to have a structure in which the spiral channel 110 is formed on the first substrate 100, the single hydrodynamic filtration channel is formed on the second substrate 200, and the inter-substrate way is formed between the first substrate 100 and the second substrate 200 as shown in FIG. 4. By the micro-electro-mechanical system (MEMS) and replica processes, channels having a height of about 80 μm are formed of PDMS on the first substrate 100 and the second substrate 200, and the substrates were penetrated using a round knife to form inlets and outlets each having a diameter of 1/16 inch to install 1/16 inch tubing. A surface of the first substrate 100 on which the channel is formed was bonded to a surface of the second substrate 200 on which the channel is not formed by using oxygen plasma bonding or any other appropriate methods, and then a surface of the second substrate 200, bonded to the first substrate 100, on which the channel is formed, is bonded to a glass substrate having a larger area. The first substrate 100 and the second substrate 200 may have a thickness of 2 mm to 3 mm, and the glass substrate may have a thickness of 1.0 mm to 1.5 mm.

It should be understood that the above-described method of processing the channels and dimensions related to the channels and the substrates are merely exemplary and do not limit the manufacturing method or the shape of the microfluidio-chip sorting apparatus according to embodiments.

The present inventors have conducted sorting of human mesenchymal stem cells (hMSCs), as a trimodal sample, in which a small-sized particle group (diameter of 22 μm or less), a medium-sized particle group (diameter of 22 μm to 33 μm), and a large-sized particle group (diameter of 33 μm or more) are dispersed. Details about preparation or storage of samples are disclosed in the paper of Jung et al. Although hMSCs were sorted according to an embodiment, the embodiment is not limited particular cells.

Based on fluorescence microscope images collected in each vial, it was confirmed that the hMSCs contained in the injected hMSC sample solution were sorted by size so that the small-sized particle group was discharged through the spiral inner-outlet 130, the medium-sized particle group was discharged through the HDF Outlet 1, and the large-sized particle group was discharged through the HDF Outlet 2. A certain volume of the samples collected in each vial was taken, and the number of the three fractions of hMSCs contained therein was estimated using a fluorescence microscope and image processing software.

Figure 8A:
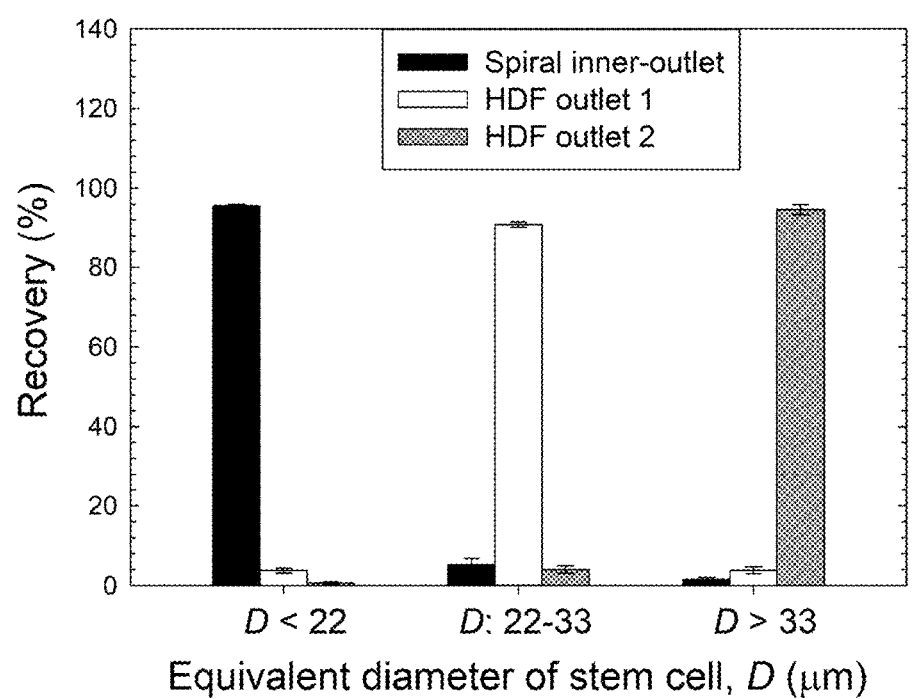
FIG. 8A is a graph showing recovery obtained based on the sorting results of trimodal cell particles using a microfluidic-chip fabricated having a structure in which a spiral channel is coupled with a single hydrodynamic filtration channel according to an embodiment.
Figure 8B:
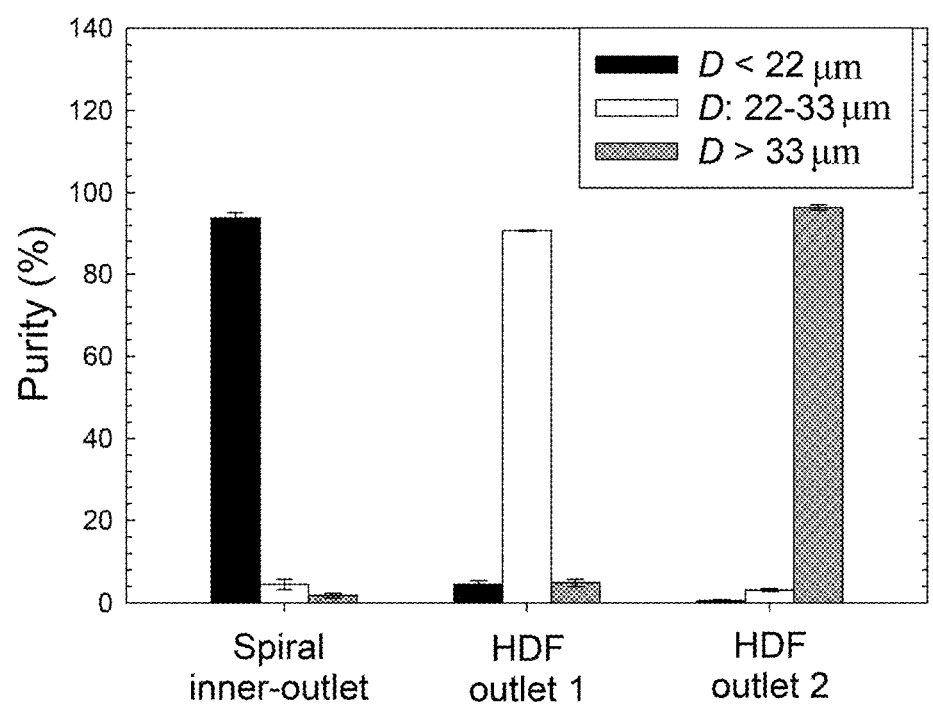
FIG. 8B is a graph showing purity obtained based on the sorting results of trimodal cell particles using a microfluidic-chip fabricated having a structure in which a spiral channel is coupled with a single hydrodynamic filtration channel according to an embodiment.

FIGS. 8A and 8B are graphs showing recovery and purity obtained based on the sorting results of trimodal cell particles according to an embodiment. The recovery and purity are criteria for quantitatively evaluating sorting efficiency or sorting performance. The recovery is defined as [number of desired particles collected from a particular outlet]/[total number of desired particles in the sample collected from all outlets]. Also, the purity is defined as [number of desired particles]/[total particle number in the sample collected at each outlet].

Figure 9A:
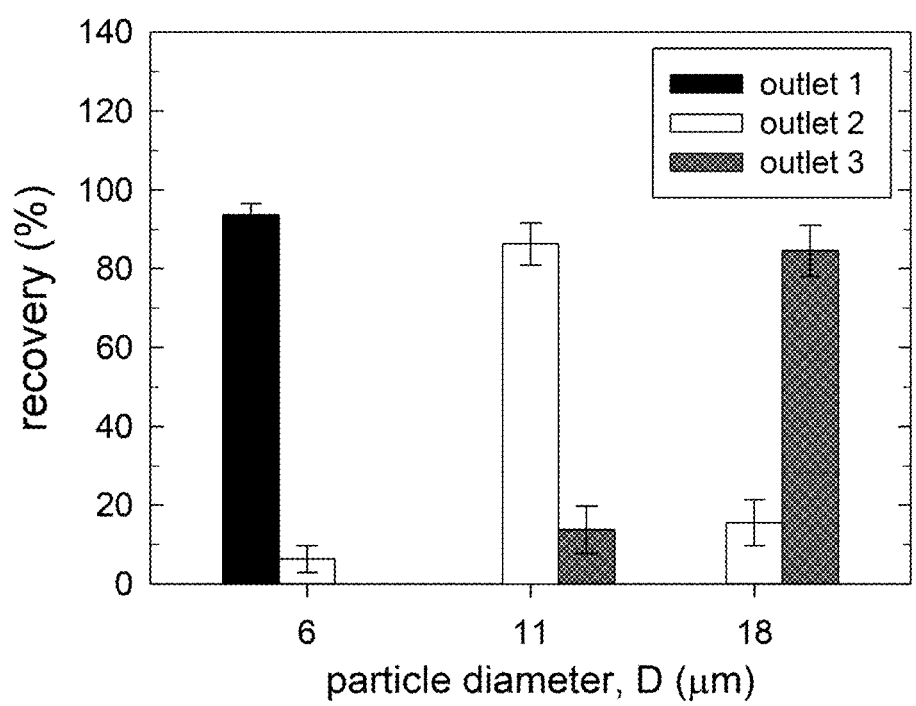
FIG. 9A is a graph showing recovery obtained based on the sorting results of tridisperse latex particles using a conventional microfluidic-chip filtration apparatus with a spiral branch channel.
Figure 9B:
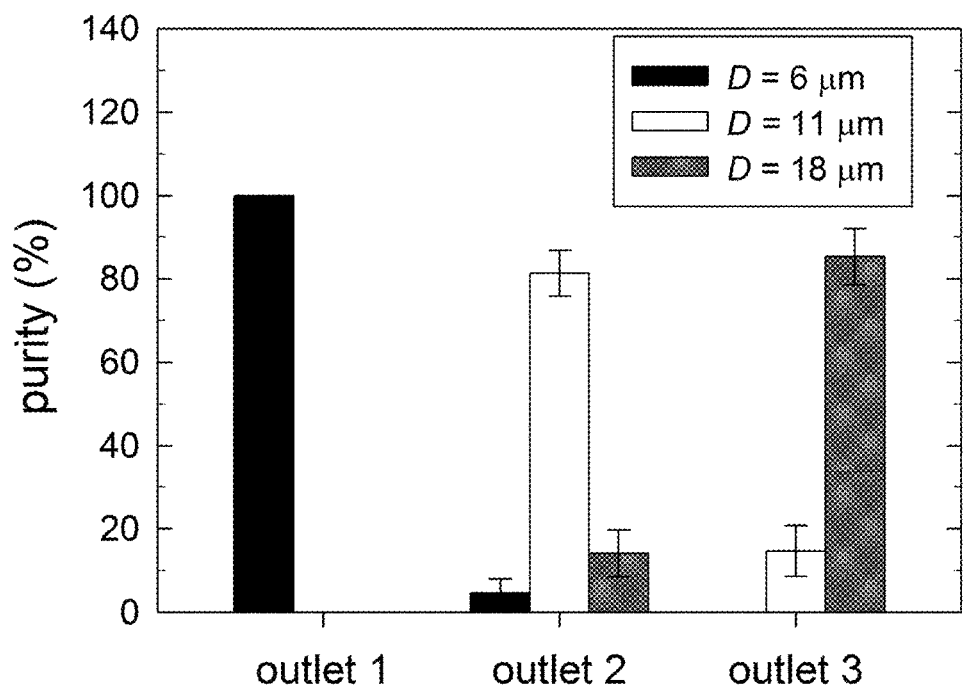
FIG. 9B is a graph showing purity obtained based on the sorting results of tridisperse latex particles using a conventional microfluidic-chip filtration apparatus with a spiral branch channel.

FIGS. 9A and 9B are graphs illustrating recovery and purity obtained based on the sorting results of tridisperse latex particles using a conventional microfluidic-chip filtration apparatus with a spiral branch channel.

Upon comparison of the recovery between FIGS. 8A and 9A and the purity between FIGS. 8B and 9B, it may be confirmed that both recovery and purity obtained using the microfluidic-chip sorting apparatus according to an embodiment of the present invention were achieved about 95%, indicating improvement relative to those obtained using the conventional apparatus. Furthermore, since trimodal cell particles having a standard deviation according to the embodiment of the hMSCs are more difficult to sort than tridisperse particles, superior effects of increasing sorting efficiency may be obtained according to the present invention.

While the present invention has been particularly shown and described with reference to exemplary embodiments thereof, it will be understood by one of ordinary skill in the art that various changes in form and details may be made therein without departing from the spirit and scope of the present invention as defined by the following claims.

The invention claimed is:

1. An apparatus for cell particle sorting based on microfluidic-chip flow, the apparatus comprising:
    a spiral channel structure coupled with a double hydrodynamic filtration channel having different cut-off width ($W_C$) values under Dean number (De) conditions;
    the spiral channel structure comprising a first substrate configured such that Dean flow focusing occurs;
    the double hydrodynamic filtration channel comprising a second substrate configured such that hydrodynamic filtration (HDF) occurs in parallel among a first HDF channel and a second HDF channel having different $W_C$ values; and
    an inter-substrate way connecting the first substrate to the second substrate,
    wherein at least a part of a sample solution of cell particles moves to the second substrate after passing through the first substrate,
    wherein the inter-substrate way comprises two or more paths between the first substrate and the second substrate, each path selecting particles of the sample solution of cell particles according to a value of De determined by flow conditions of the sample solution flowing into the first substrate, and
    wherein a first path of the two or more paths couples a spiral inner-outlet of the first substrate to the first HDF channel of the second substrate and a second path of the two or more paths couples a spiral outer-outlet of the first substrate to the second HDF channel of the second substrate.

2. The apparatus of claim 1, wherein the first substrate comprises:
    a spiral channel having an inner surface and an outer surface based on a radius of curvature;
    a sample solution inlet located at the center of the spiral channel;
    a medium inlet located at an outermost portion of the spiral channel;
    an inner outlet-way diverging from the end of the spiral channel positioned in direct contact with the inner surface and an outer outlet-way diverging therefrom positioned in direct contact with the outer surface; and
    the spiral inner-outlet and the spiral outer-outlet are positioned as outlets for discharging the cell particles to the outside through at least one of the inner outlet-way and the outer outlet-way.

3. The apparatus of claim 2, wherein the second substrate comprises:
    a main channel in which the sample solution discharged from the first substrate and passing through the inter-substrate way flows and a cut-off width ($W_C$) value is set;
    a side channel connected to the main channel and allowing a medium introduced into a medium inlet of the first substrate to flow therein to focus the sample solution on a sidewall of the main channel opposite to a medium introduction side;
    at least one branch channel connected to the sidewall of the main channel in a spanwise direction and configured to receive the cell particles from the main channel;
    a branch channel collector in which ends of the at least one branch channel joins; and
    a hydrodynamic filtration channel comprising a main channel outlet and at least one branch channel outlet formed at the end of the branch channel collector.

4. The apparatus of claim 3, wherein two or more hydrodynamic filtration channels are independently installed by designing the two or more hydrodynamic filtration channels to have different $W_C$ values in accordance with flow conditions of the sample solution and size fractions of particles.

5. The apparatus of claim 3, wherein the inter-substrate way connecting the first substrate to the second substrate further comprises:
    a medium inter-substrate way allowing a medium injected into the medium inlet of the first substrate to flow toward a side channel of the second substrate;
    an outer-outlet inter-substrate way allowing cell particles discharged through the spiral outer-outlet to flow toward a main channel of the second substrate; and
    an inner-outlet inter-substrate way allowing cell particles discharged through the spiral inner-outlet to flow toward another main channel of the second substrate when the second substrate comprises two or more hydrodynamic filtration channels having different $W_C$ values.

6. The apparatus of claim 5, wherein the sample solution is a tridisperse sample solution comprising large-sized particles having a first average diameter, medium-sized particles having a second average diameter less than the first average diameter, and small-sized particles having different sizes less than the second average diameter,
    under low-flow velocity conditions comprising a De<5, the tridisperse sample solution injected into the sample solution inlet of the first substrate flows in such a mode that small-sized particles are discharged to the outside through the inner outlet-way of the spiral channel and then the spiral inner-outlet, and medium-sized and large-sized particles flow into the main channel of the second substrate after passing through the outer outlet-way of the spiral channel, the spiral outer-outlet, and the outer-outlet inter-substrate way, following that the medium-sized particles are discharged through the branch channel outlet (HDF Outlet 1) and the large-sized particles are discharged through the main channel outlet (HDF Outlet 2), and
    on the contrary, under high-flow velocity conditions comprising a De>20, the tridisperse sample solution flows in such a mode that the large-sized particles are discharged to the outside through the inner outlet-way of the spiral channel and then the spiral inner-outlet, and the medium-sized and the small-sized particles flow into the main channel of the second substrate after passing through the outer outlet-way of the spiral channel, the spiral outer-outlet, and the outer-outlet inter-substrate way, following that the small-sized particles are discharged through the branch channel outlet (HDF Outlet 1) and the medium-sized particles are discharged through the main channel outlet (HDF Outlet 2).

7. The apparatus of claim 5, wherein the sample solution is a tridisperse sample solution comprising large-sized particles having a first average diameter, medium-sized particles having a second average diameter less than the first average diameter, and small-sized particles having different sizes less than the second average diameter, when two or more hydrodynamic filtration channels having different $W_C$ values are formed in the second substrate, under low-flow velocity conditions comprising a De<10, the tridisperse sample solution injected into the sample solution inlet of the first substrate flows in such a mode that the medium-sized and large-sized particles flow into a main channel of the second substrate after passing through the outer outlet-way of the spiral channel, the spiral outer-outlet, and the outer-outlet inter-substrate way, following that the medium-sized particles are discharged through the branch channel outlet (HDF Outlet 1) and the large-sized particles are discharged through the main channel outlet (HDF Outlet 2), and meanwhile the medium-sized and the small-sized particles flow into a next main channel of the second substrate after passing through the inner outlet-way of the spiral channel, the spiral inner-outlet, and the inner-outlet inter-substrate way, following that the small-sized particles are discharged through a next branch channel outlet (HDF Outlet 3) and the medium-sized particles are discharged through a next main channel outlet (HDF Outlet 4), and on the contrary, under high-flow velocity conditions comprising a De>10, the tridisperse sample solution flows in such a mode that the medium-sized and the small-sized particles flow into the main channel of the second substrate after passing through the outer outlet-way of the spiral channel, the spiral outer-outlet, and the outer-outlet inter-substrate way, following that the small-sized particles are discharged through the branch channel outlet (HDF Outlet 1) and the medium-sized particles are discharged through the main channel outlet (HDF Outlet 2), and meanwhile, the medium-sized and the large-sized particles flow in the next main channel of the second substrate after passing through the inner outlet-way of the spiral channel, the spiral inner-outlet, and the inner-outlet inter-substrate way, following that the medium-sized particles are discharged through the next branch channel outlet (HDF Outlet 3) and the large-sized particles are discharged through the next main channel outlet (HDF Outlet 4).

8. The apparatus of claim 2, wherein the sample solution is a trimodal sample solution comprising a large-sized particle group having a first average diameter, a medium-sized particle group having a second average diameter less than the first average diameter, and a small-sized particle group having different sizes less than the second average diameter, when the second substrate comprises one hydrodynamic filtration channel having a $W_C$ value to perform hydrodynamic filtration, a width ($W_{SP-I}$) of the inner outlet-way at the end of the spiral channel of the first substrate satisfies an equation of $$D_L + \sigma_L < W_{SP-I} \leq \frac{W_{SP}}{3f},$$

wherein $D_L$ is an average diameter of the large-sized particle group, $\sigma_L$ is a standard deviation, $W_{SP}$ is a width of the spiral channel, f is an adjustment factor between 1 to 2, and a width ($W_{SP-O}$) of the outer outlet-way is obtained by $W_{SP}$-$W_{SP-I}$.

9. The apparatus of claim 2, wherein when two hydrodynamic filtration channels having different $W_C$ values are formed on the second substrate, a width of the inner outlet-way and a width of the outer outlet-way at the end of the spiral channel of the first substrate satisfy equally ½ of the width of the spiral channel, respectively.

10. The apparatus of claim 2, wherein when diameters of the cell particles are expressed as D, a width of the spiral channel is expressed as $W_{SP}$, and a height of the spiral channel is expressed as H, an equation of $D(W_{SP}+H)/2W_{SP}H>0.07$ is satisfied.

11. The apparatus of claim 2, wherein when diameters of the cell particles are expressed as D, a radius of curvature of the spiral channel is expressed as $R_C$, and a height of the spiral channel is expressed as H, an equation of $0.08 \leq 2D^2 R_C/H^3 < 25$ is satisfied.

12. The apparatus of claim 3, wherein the branch channel comprises a narrow section acting as a substantial flow resistance for filtration and a wide section having a greater width than that of the narrow section by 1.5 times or more for the purpose of preventing backflow, and lengths of the narrow section and the wide section vary, respectively.

13. The apparatus of claim 3, wherein the sample solution includes a plurality of cell particle fractions (Np) with different sizes, wherein the number of the branch channel outlets in an individual hydrodynamic filtration channel is Np−2, two less than the number of particle fractions.

14. A method for cell particle sorting based on microfluidic-chip flow, the method comprising:
injecting a sample solution including particles into a spiral channel of a first substrate;
injecting a medium into a medium inlet of the first substrate allowing the medium to flow in a side channel of a second substrate through an inter-substrate way;
focusing and sorting the particles under flow conditions of the sample solution by inertial lift force and Dean drag force in the spiral channel of the first substrate having an inner surface and an outer surface with respect to a radius of curvature;
discharging the particles from the spiral channel through the inner outlet-way and the outer outlet-way and then the spiral inner-outlet and the spiral outer-outlet;
moving the particles of the sample solution discharged from the spiral channel located above the second substrate to the second substrate through the inter-substrate way, the inter-substrate way comprising two or more paths between the first substrate and the second substrate, each path selecting particles of the sample solution of cell particles according to a value of a Dean number (De) determined by flow conditions of the sample solution flowing into the first substrate, wherein a first path of the two or more paths couples the spiral inner-outlet of the first substrate to a first hydrodynamic filtration (HDF) channel of the second substrate and a second path of the two or more paths couples the spiral outer-outlet of the first substrate to a second HDF channel of the second substrate, the first HDF channel and the second HDF channel comprising a double hydrodynamic filtration channel whereby hydrodynamic filtering occurs in parallel due to different $W_C$ values of the first HDF channel and the second HDF channel;

focusing the sample solution flowing in the main channel of the second substrate on a sidewall of the main channel by the medium; and sorting the particles while the sample solution flows in the main channel and at least one branch channel.

15. The method of claim 14, wherein since the sample solution includes first particles and second particles smaller than the first particles, the sorting of the particles by Dean flow focusing based on a value of Dean number (De) and discharging from the first substrate comprises:

discharging the first particles or the second particles through the spiral inner-outlet located relatively adjacent to the inner surface of the spiral channel; and discharging the first particles or the second particles through the spiral outer-outlet located relatively adjacent to the outer surface of the spiral channel.

16. The method of claim 14, wherein the sorting of the particles by hydrodynamic filtration based on the size in the second substrate further comprises:

transporting particles in the main channel without entering into the branch channel to a next branch channel located behind the branch channel according to cut-off widths ($W_C$) and particle radii;

sorting the particles in the next branch channel according to cut-off widths ($W_C$) and particle radii; and discharging the particles to the outside through the branch channel collector by repeating the above-described process by the number of the branch channels, and then through the branch channel outlet.

* * * * *